United States Patent
Braunagel et al.

(10) Patent No.: US 10,766,497 B2
(45) Date of Patent: Sep. 8, 2020

(54) METHOD FOR DEACTIVATING AN AUTOMATED DRIVING FUNCTION OF A VEHICLE AND DRIVER ASSISTANCE SYSTEM FOR IMPLEMENTING THE METHOD

(71) Applicant: DAIMLER AG, Stuttgart (DE)

(72) Inventors: Christian Braunagel, Stuttgart (DE); Thorben Schönenberg, Gomaringen (DE)

(73) Assignee: Daimler AG, Stuttgart (DE)

( * ) Notice: Subject to any disclaimer, the term of this patent is extended or adjusted under 35 U.S.C. 154(b) by 171 days.

(21) Appl. No.: 16/063,445

(22) PCT Filed: Nov. 21, 2016

(86) PCT No.: PCT/EP2016/001962
§ 371 (c)(1),
(2) Date: Jun. 18, 2018

(87) PCT Pub. No.: WO2017/102057
PCT Pub. Date: Jun. 22, 2017

(65) Prior Publication Data
US 2018/0370542 A1 Dec. 27, 2018

(30) Foreign Application Priority Data

Dec. 19, 2015 (DE) .......... 10 2015 016 597
Jun. 14, 2016 (DE) .......... 10 2016 007 187

(51) Int. Cl.
*B60W 50/10* (2012.01)
*B60W 30/12* (2020.01)
(Continued)

(52) U.S. Cl.
CPC ............ *B60W 50/10* (2013.01); *B60W 30/12* (2013.01); *B60W 30/16* (2013.01);
(Continued)

(58) Field of Classification Search
CPC ...... B60W 50/10; B60W 30/12; B60W 30/16; B60W 2540/10; B60W 2540/103; B60W 2540/12; B60W 2540/18; B60K 2310/246
(Continued)

(56) References Cited

U.S. PATENT DOCUMENTS 9,381,916 B1 * 7/2016 Zhu .................. G01S 13/867
2013/0060413 A1 * 3/2013 Lee .................. B62D 1/286
701/23

(Continued)

FOREIGN PATENT DOCUMENTS

DE          10144797 A1     3/2003
DE        102006057842 A1   6/2008
DE        102012112442 A1   6/2014

OTHER PUBLICATIONS

International Search Report dated Feb. 10, 2017 in related International Application No. PCT/EP2016/001962.
(Continued)

*Primary Examiner* — Yazan A Soofi
(74) *Attorney, Agent, or Firm* — Patent Portfolio Builders PLLC

(57) ABSTRACT

A method for deactivating an automated driving function of a vehicle, in particular a highly automated or autonomous driving function, is provided. The driving function is deactivated when a driver of the vehicle carries out a steering intervention or pedal intervention with a strength exceeding a predeterminable deactivation threshold. The deactivation threshold is predetermined depending on an operation length of the driving function and/or depending on a responsiveness of the driver. In particular, the deactivation threshold is predetermined in such a manner that it is higher directly after an activation of the driving function than some time after-
(Continued)

wards and/or it is higher with a low responsiveness of the driver than with a high responsiveness of the driver.

19 Claims, 1 Drawing Sheet

(51) Int. Cl.
  *B60W 30/16* (2020.01)
  *B60W 50/00* (2006.01)
(52) U.S. Cl.
  CPC .......... *B60K 2310/246* (2013.01); *B60W 2050/0073* (2013.01); *B60W 2540/10* (2013.01); *B60W 2540/103* (2013.01); *B60W 2540/12* (2013.01); *B60W 2540/18* (2013.01); *B60W 2540/26* (2013.01)
(58) Field of Classification Search
  USPC ............................................................ 701/1
  See application file for complete search history.

(56) References Cited

U.S. PATENT DOCUMENTS

| 2014/0018993 A1* | 1/2014 | Kindo | B60W 30/143 |
| | | | 701/23 |
| 2014/0303827 A1* | 10/2014 | Dolgov | B62D 15/025 |
| | | | 701/23 |
| 2015/0120124 A1* | 4/2015 | Bartels | B60W 50/10 |
| | | | 701/23 |
| 2017/0053534 A1* | 2/2017 | Lokesh | B60W 30/16 |

OTHER PUBLICATIONS

Written Opinion dated Feb. 10, 2017 in related International Application No. PCT/EP2016/001962.

* cited by examiner

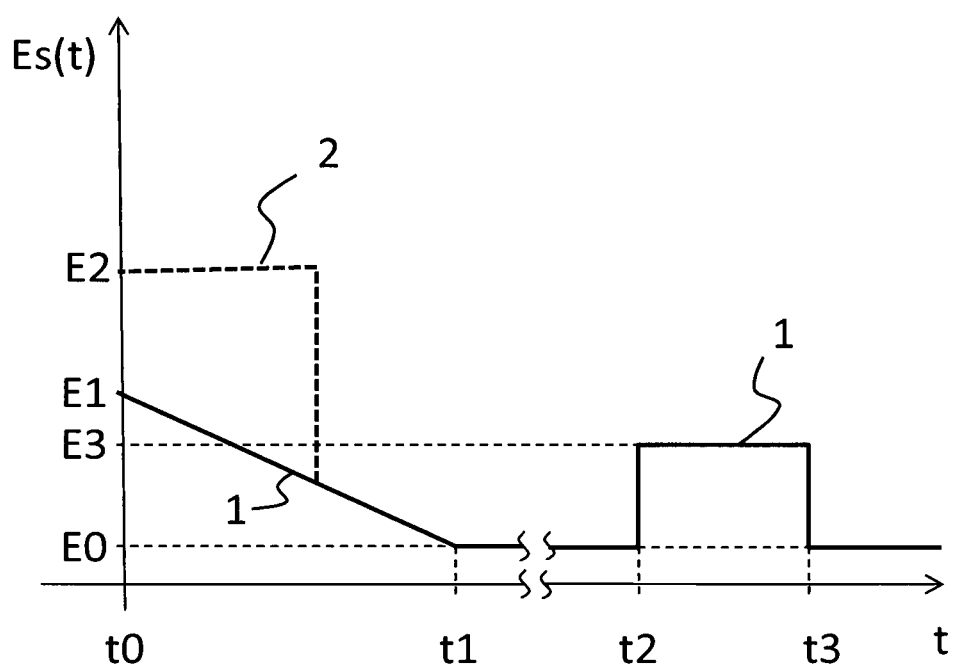

METHOD FOR DEACTIVATING AN AUTOMATED DRIVING FUNCTION OF A VEHICLE AND DRIVER ASSISTANCE SYSTEM FOR IMPLEMENTING THE METHOD

BACKGROUND AND SUMMARY

Exemplary embodiments of the invention relate to a method for deactivating an automated driving function of a vehicle and a driver assistance system.

German patent document DE 102006057842 A1 discloses a method in which a driving function for avoiding side collisions of a vehicle with lateral objects is automatically performed. However, the driver of the vehicle can interrupt the collision-avoiding driving function by actuating a steering wheel, an accelerator pedal or a brake pedal of the vehicle to such an extent that a deactivation threshold is exceeded. One disadvantage of this method is that the driver can also deactivate the driving function by an accidental actuation of the steering wheel, the brake pedal or the accelerator pedal and thus no longer receives any system support for avoiding collisions.

Exemplary embodiments of the invention are directed to a method and corresponding driver assistance function with which accidental deactivations of an automated driving function can be avoided.

In the method according to the invention for deactivating an automated driving function of a vehicle, in particular of a highly automated or autonomous driving function, a driver of the vehicle can cause a deactivation of the driving function by a driver intervention, in particular by a steering intervention or by a pedal intervention, for example by a brake pedal intervention or an accelerator pedal intervention. Here, the driving function is then deactivated and the driving task is therefore transferred to the driver when the driver intervention exceeds a deactivation threshold, wherein the deactivation threshold is predetermined depending on the operation time of the driving function, i.e., depending on the time which has elapsed since the activation of the driving function. Alternatively, or additionally, the deactivation threshold can also be specified depending on the responsiveness of the driver. Herein, the term "responsiveness" is used synonymously with the terms "attentiveness" or "readiness of the driver to take over the driving task", because the higher the attentiveness of the driver is or the higher the readiness of the driver to take over the driving task is, the higher the responsiveness of the driver is.

The deactivation threshold is thus variable and is adapted to the operating state of the vehicle, namely to the operation time of the driving function, or to the state of the driver, by means of its variation.

In an advantageous development of the method, the deactivation threshold is predetermined in such a manner that it is higher directly after the activation of the driving function than some time afterwards.

In a further advantageous development of the method, the deactivation threshold is predetermined in such a manner that it is higher with a low responsiveness of the driver than with a high responsiveness of the driver.

Preferably, the deactivation threshold is predetermined in such a manner that it continuously decreases up to a pre-defined pre-set threshold value with increasing time since the last activation of the driving function.

Preferably, the deactivation threshold is specified in such a manner that, during a predeterminable time window from the activation of the driving function, it is at least equal to a value which corresponds to the driver intervention at the time of the activation of the driving function.

A driver assistance system for the highly automated or autonomous driving operation of a vehicle is set up according to the invention in such a manner that it carries out the method according to the invention.

BRIEF DESCRIPTION OF THE DRAWING FIGURES

The invention is explained in more detail below by means of an exemplary embodiment with reference to FIG. 1, which shows the temporal course of a deactivation threshold of an automated driving function of a vehicle.

DETAILED DESCRIPTION

FIG. 1 shows the temporal course of a deactivation threshold of an automated driving function of a vehicle. The automated driving function is a driver assistance function for supporting a driver of the vehicle with vehicle guidance. Here, in particular, it is a longitudinal control function with which, for example, a distance and speed control is achieved, and/or a transverse control function with which, for example, a control for staying in lane is achieved. Here, in particular, it is a driving function for longitudinal and transversely controlled guiding of the vehicle during a highly automated or autonomous driving operation.

When the driver activates this driving function supporting him, he transfers the driving task to a driver assistance system of the vehicle, which is set up for carrying out the driving function. If thereafter the driver intervenes in the driving operation by means of a driver intervention so strongly that a predeterminable deactivation threshold is exceeded, the driving function is deactivated and the driving task is transferred back to the driver. Here, the driver is informed of the deactivation of the driving function optically and acoustically, and preferably additionally haptically.

The driver intervention is a steering intervention due to a steering wheel actuation or a pedal intervention, for example a brake intervention due to a brake pedal actuation or an accelerator pedal intervention due to an accelerator pedal actuation. A separate deactivation threshold is assigned to each of these interventions. In other words, the driving function is deactivated when the driver requests a drive torque by the accelerator pedal actuation, the drive torque being greater than the deactivation threshold assigned to the accelerator pedal intervention, or the driving function is deactivated when the driver requests a braking torque by the brake pedal actuation, the braking torque being greater than the deactivation threshold assigned to the brake engagement, or the driving function is deactivated when the driver requests a steering torque by the steering wheel actuation, the steering torque being greater in magnitude than the deactivation threshold assigned to the steering intervention.

The deactivation threshold assigned to the accelerator pedal intervention is described in more detail in the following. The assigned deactivation thresholds for the brake pedal intervention and the steering intervention are defined analogously.

According to the diagram shown in FIG. 1, the time t is recorded on the horizontal axis and the deactivation threshold $Es(t)$ is recorded on the vertical axis. The driving function is inactive before a first point in time t0 and the deactivation threshold $Es(t)$ is undefined, i.e., it can have any value and can, for example, be set to the value of zero.

At the point in time t0, the automated driving function is activated by the driver. At this point in time t0, also called the activation point in the following, the deactivation threshold Es(t) is set to a first threshold value E1, provided that the driver does not carry out any accelerator pedal intervention at this point in time t0 or carries out an accelerator pedal intervention that is so weak that the resulting drive torque is below the first threshold value E1. Here, the first threshold value E1 is greater than a predefined pre-set threshold value E0 by a first predeterminable adaptation value ΔE1, i.e., E1=E0+ΔE1. The background for predetermining the adaptation value ΔE1 is that, during the activation of the automated driving function, there are typically accelerator pedal interventions, brake pedal interventions and steering interventions of a driver because the driver has independently executed the driving task shortly beforehand.

Finally, the deactivation threshold Es(t) is reduced within a predetermined time window t0 to t1 up to the pre-set threshold value E0 and kept constant at this value thereafter. The solid curve 1 illustrates this course.

As shown using the curve 1, in the present exemplary embodiment the deactivation threshold Es(t) is reduced in a linear manner from the first threshold value E1 to the pre-set threshold value E0. However, exemplary embodiments in which this decrease is non-linear or in which the deactivation threshold Es(t) is initially kept constant and then is progressively, in a linear or non-linear manner, reduced to the pre-set threshold value E0, or in which the deactivation threshold Es(t) is kept constant for the entire time window t0 to t1 and is abruptly reduced to the pre-set threshold value E0 only at the point in time t1, are also conceivable.

As already stated, the course depicted by the curve 1 applies in the case that the driver does not carry out any accelerator pedal intervention at the activation point in time t0 or only carries out a weak accelerator pedal intervention in which the first threshold value E1 is not exceeded. If, however, the driver carries out an accelerator pedal intervention at the activation point in time t0 in which the requested driving torque exceeds the first threshold value E1, the deactivation threshold Es(t) is set to a second threshold value E2 at the point in time t0. Here, the second threshold value E2 corresponds to the driving torque requested by the driver at the activation point in time t0 plus an offset. The offset is predetermined in order to increase the robustness of the method against signal noise and against unknowing fluctuations of the accelerator pedal intervention carried out by the driver. The deactivation threshold Es(t) is, as depicted by the dashed line 2, kept at this second threshold value E2 for as long as the accelerator pedal intervention continues. Upon completion of the accelerator pedal intervention, the deactivation threshold Es(t) is reduced to the value depicted by the solid line 1.

In an advantageous embodiment of the method, the deactivation threshold Es(t) is kept constant at the pre-set threshold value E0 from the point in time t1 only for as long as the responsiveness of the driver, i.e., his attentiveness or his readiness to take over the driving task, is high. When the driver is inattentive, his responsiveness for taking over the driving task is low. When this, as shown in FIG. 1, is established at a point in time t2, the deactivation threshold Es(t) is increased by an adaptation value ΔEr, which is conditional on the response, to a third threshold value E3, i.e. E3=E0+ΔEr. This rise remains as long as the driver is inattentive. If it is then determined that the driver is attentive again, i.e., when his responsiveness is high again, the deactivation threshold Es(t) is reduced to the pre-set threshold value E0 again. In the FIGURE, this occurs at a point in time t3.

The adaptation value ΔEr, which is conditional on the response, is advantageously predetermined depending on the responsiveness of the driver, i.e., depending on his attentiveness state. The lower the responsiveness of the driver or the attentiveness of the driver is, the higher the adaptation value ΔEr, which is conditional on the response, is set, and the higher the deactivation threshold Es(t) will then be.

The responsiveness of the driver or his attentiveness is determined in a conventional manner by observation of the driver behavior. For example, driver operating actions on operating units of the vehicle, in particular on operating units of a navigation system, a telephone system or an entertainment system, are observed. In particular, drive-extrinsic operating actions such as reading and writing e-mails, surfing the internet, etc. that strongly distract the attentiveness of the driver from the driving events, are observed. Furthermore, the head posture and/or the viewing behavior of the driver are observed by means of a camera in order to establish where the driver is looking and where his attentiveness is directed and how long his gaze continues on the street, or to establish using blinking whether the driver is tired. If, for example, it is established by this observation that the driver has not been looking at the street but instead at a display for longer than a predeterminable minimum time period, or is turned towards the vehicle occupants, in particular the vehicle occupants on the back seat, or has assumed a sitting position which is not adequate for taking over the vehicle task, or is tired, then it is considered that the responsiveness of the driver and thus his readiness to take over the driving task is low, which then leads to an increase in the deactivation threshold Es(t) according to the invention.

As a result, the deactivation threshold Es(t) defined for deactivating the automated driving function is adapted to the operation length of the driving function, i.e., to the time elapsed since the activation of the driving function, and to the readiness of the driver to take over the driving task again, and it is made more difficult for the driver to deactivate the driving function by an unknowing or unintended action.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
    activating an automated driving function of a vehicle;
    determining whether a driver intervention occurs; and
    deactivating the automated driving function responsive to
        the driver intervention exceeding a predetermined deactivation threshold, wherein the deactivation threshold is predetermined depending on an operation length of the automated driving function and on a responsiveness of the driver.

2. The method of claim 1, wherein the deactivation threshold is predetermined in such a manner that the deactivation threshold is higher directly after an activation of the driving function than a period of time after activation of the driving function.

3. The method of claim 1, wherein the deactivation threshold is predetermined in such a manner that the deactivation threshold continuously decreases to a predefined pre-set threshold value as time increases since the activation of the driving function.

4. The method of claim 1, wherein the deactivation threshold is predetermined in such a manner that, during a predetermined time window from the activation of the driving function, the deactivation threshold is at least equal to a value corresponding to a driver intervention occurring when the driving function is activated.

5. The method of claim 1, wherein the driver intervention is a pedal intervention in a pedal of the vehicle or a steering intervention in a steering wheel of the vehicle.

6. The method of claim 1, wherein the method is performed during a highly automated or autonomous driving operation.

7. The method of claim 1, wherein the deactivation threshold is predetermined in such a manner that the deactivation threshold is higher with a low responsiveness of the driver than with a high responsiveness of the driver.

8. The method of claim 1, further comprising:
determining the responsiveness of the driver based on drive-extrinsic operating actions.

9. The method of claim 1, wherein the predetermined activation threshold increases to a threshold value so long as a driver of the vehicle is inattentive.

10. The method of claim 9, wherein the predetermined activation threshold decreases from the threshold value when the driver is responsive again.

11. A method, comprising: activating an automated driving function of a vehicle; determining whether a driver intervention occurs; and deactivating the automated driving function responsive to the driver intervention exceeding a predetermined deactivation threshold, wherein the deactivation threshold is predetermined depending on an operation length of the automated driving function and on a responsiveness of the driver, wherein the deactivation threshold is predetermined in such a manner that the deactivation threshold is higher with a low responsiveness of the driver than with a high responsiveness of the driver.

12. The method of claim 11, further comprising:
determining the responsiveness of the driver based on drive-extrinsic operating actions.

13. The method of claim 11, wherein the predetermined activation threshold increases to a threshold value so long as a driver of the vehicle is inattentive.

14. The method of claim 13, wherein the predetermined activation threshold decreases from the threshold value when the driver is responsive again.

15. A driver assistance system for a highly automated or autonomous driving operation of a vehicle, the driver assistance system being configured to:
activate an automated driving function of a vehicle;
determine whether a driver intervention occurs; and
deactivate the automated driving function responsive to the driver intervention exceeding a predetermined deactivation threshold, wherein the deactivation threshold is predetermined depending on an operation length of the automated driving function and on a responsiveness of the driver.

16. The driver assistance system of claim 15, wherein the deactivation threshold is predetermined in such a manner that the deactivation threshold is higher with a low responsiveness of the driver than with a high responsiveness of the driver.

17. The driver assistance system of claim 15, wherein the driver assistance system is further configured to:
determine the responsiveness of the driver based on drive-extrinsic operating actions.

18. The driver assistance system of claim 15, wherein the predetermined activation threshold increases to a threshold value so long as a driver of the vehicle is inattentive.

19. The driver assistance system of claim 18, wherein the predetermined activation threshold decreases from the threshold value when the driver is responsive again.

* * * * *